United States Patent
Di Giusto et al.

(10) Patent No.: US 8,156,326 B2
(45) Date of Patent: Apr. 10, 2012

(54) METHOD TO SEARCH FOR AFFINITIES BETWEEN SUBJECTS AND RELATIVE APPARATUS

(75) Inventors: Sandro Di Giusto, Treppo Grande (IT); Pier Luca Montessoro, Faedis (IT); Davide Pierattoni, Gradisca d'Isonzo (IT)

(73) Assignee: Eurotech SpA, Amaro (UD) (IT)

( * ) Notice: Subject to any disclaimer, the term of this patent is extended or adjusted under 35 U.S.C. 154(b) by 937 days.

(21) Appl. No.: 12/096,669

(22) PCT Filed: Dec. 7, 2006

(86) PCT No.: PCT/EP2006/069444
§ 371 (c)(1),
(2), (4) Date: Jun. 9, 2008

(87) PCT Pub. No.: WO2007/065931
PCT Pub. Date: Jun. 14, 2007

(65) Prior Publication Data
US 2008/0282085 A1   Nov. 13, 2008

(30) Foreign Application Priority Data
Dec. 9, 2005   (IT) .............................. UD2005A0209

(51) Int. Cl.
*H04L 29/00* (2006.01)
(52) U.S. Cl. ...................................... 713/155; 713/150
(58) Field of Classification Search .................. 713/150, 713/155; 380/247–250, 258
See application file for complete search history.

(56) References Cited

U.S. PATENT DOCUMENTS

| 4,405,829 A | 9/1983 | Rivest et al. |
| 7,254,711 B2* | 8/2007 | Shigematsu et al. .......... 713/175 |
| 2002/0090911 A1 | 7/2002 | Evans et al. |
| 2005/0140507 A1 | 6/2005 | Woo et al. |
| 2005/0174975 A1* | 8/2005 | Mgrdechian et al. ......... 370/338 |

(Continued)

FOREIGN PATENT DOCUMENTS
EP    1 519 288 A    3/2005
(Continued)

OTHER PUBLICATIONS

N. Eagle et al., "Social Serendipity: Proximity Sensing and Cueing", MIT Media Laboratory Technical Note 580, (2004).

(Continued)

*Primary Examiner* — Vivek Srivastava
*Assistant Examiner* — Helai Salehi
(74) *Attorney, Agent, or Firm* — Panitch Schwarze Belisario & Nadel LLP

(57) ABSTRACT

A method to search for affinities between subjects comprises registering a user with a certification authority, receiving first information relating to the user, memorizing the first information in a portable electronic device of the user, and synthesizing the first information by transmitting it to a user interface which processes the first information memorized. The method also comprises encrypting the first information and memorizing the first information encrypted in the portable electronic device, disseminating the first encrypted information to other portable electronic devices in geographical proximity, collecting second encrypted information relating to other users, sent from other portable electronic devices in geographical proximity and decrypting the first and second information encrypted at the certification authority. Finally, the method provides for processing and analyzing the first and second decrypted information, in order to identify affinities between them, at the certification authority, and notifying the affinities, by the certification authority.

10 Claims, 4 Drawing Sheets

U.S. PATENT DOCUMENTS

2005/0250552 A1  11/2005  Eagle et al.
2007/0083754 A1* 4/2007  Bacon .......................... 713/160

FOREIGN PATENT DOCUMENTS

NL    1001830 C   8/1997
WO   01/06401 A   1/2001

OTHER PUBLICATIONS

N. Eagle et al., "Social Serendipity: Mobilizing Social Software", IEEE Pervasive Computing, Special Issue: The Smart Phone, pp. 28-34, (2005).

* cited by examiner

METHOD TO SEARCH FOR AFFINITIES BETWEEN SUBJECTS AND RELATIVE APPARATUS

CROSS-REFERENCE TO RELATED APPLICATIONS

This application is a Section 371 of International Application No. PCT/EP2006/069444, filed Dec. 7, 2006, which was published in the English language on Jun. 14, 2007, under International Publication No. WO 2007/065931 A2 and the disclosure of which is incorporated herein by reference.

BACKGROUND OF THE INVENTION

The present invention concerns a method for the automatic exchange of personal information in order to search for affinities, for example, but not only, usable in car pooling, that is, sharing the same vehicle by two or more persons so as to make a journey together. The same method can be applied in numerous other contexts where there is a need to exchange personal information in an automatic and controlled manner, for example, in the fields of health, civil defense, the search for personal affinities, games.

Car pooling is known, which consists of sharing vehicles for the movements of a plurality of users and provides the use of the same private vehicle by several people who regularly travel identical or very similar routes and who, otherwise, would have to travel with their own vehicle. The obvious benefits are a reduction in traffic, pollution, parking problems, and stress. One difficulty in promoting car pooling is the need to identify the people who travel similar routes, even though they are people with whom there are no direct contacts.

Known systems for searching affinities are based on analyzing centralized databases with information provided to the system by the users. To search for affinities in general and common routes for car pooling in particular, the user at present has to communicate his/her information to a database, inside which comparisons are then made and affinities identified. All this is generally done by means of web-based services or on Internet portals specialized in providing services of this type. The European patent application EP-A-1-519-288 is known, which, although it describes a first form of decentralized, non-web-based car pooling, is an invasive system which requires the continuous and active participation by the user for the correct and effective functioning of the system. The patent NL100183C is also known which, like the web-based systems, has the disadvantage that it has a limited scalability as the number of users grows, since all the information in their databases has to be crossed, since typically they do not have a way of selecting the pairs of users who have had the opportunity, in some circumstance, of being near each other, and who therefore can really be interested in having their affinities signaled.

The patent application US-A-20050250552 is also known, which shows a more general case of "social introduction system" for the dissemination of information concerning affinities. A disadvantage of this and the previously cited known systems is their limited security, since the database memorizes the information permanently, some of which is even confidential, of all the users, and hence represents an extremely critical element. If security were breached, for example by hackers, all the confidential information of the users could become public and be used for malicious purposes or in any case not expressly authorized by some of the users.

The following scientific publications are also known: Eagle N., and Pentland A.: "Social Serendipity: Proximity Sensing and Cueing" MIT MEDIA LABORATORY TECHNICAL NOTE 580, [ONLINE] 31 May 2004 and Eagle N., and Pentland A.: "Social Serendipity: Mobilizing Social Software" IEEE PERVASIVE COMPUTING, SPECIAL ISSUE: THE SMART PHONE, [ONLINE] 1 May 2005.

Both substantially describe an application called Serendipity, which is also the subject of US-A-20050250552, and exploits an architecture based on the function of Bluetooth devices integrated into the cell phones to identify each other by means of a single BTID identifier and to identify other BTIDs received from other Bluetooth devices located in geographical proximity. A cell phone of a new Serendipity user is suitably configured and the first time it is switched on it is connected to the Serendipity network, managed by an Apache web server. The latter automatically creates a new profile which contains the phone number and the BTID of the new user.

The new user can also integrate his/her own created profile with other information by means of a computer connected via Internet to the Apache web server. The profile of each user, with all the personal information, is permanently memorized in a MySQL database, which the Apache web server accesses.

Every time a user's cell phone receives the BTID of another cell phone, a local archive, or log file, of the phone is updated, which contains all the BTIDs received. Moreover, when a BTID that is not in the log file is received, the cell phone connects via GPRS to the Apache web server and transmits the new BTID. The Apache web server identifies the personal profile of the user associated with the new BTID received, processes the profile of the cell phone that is connected and the profile of the new BTID and generates an affinity score between the two profiles. If the affinity score is acceptable for the user of the cell phone that is connected, the Apache web server transmits to the latter all the uncoded information relating to the new BTID, such as a photograph of the user, personal data, contact address, to allow direct contact between the two users.

The Serendipity application described in the above scientific publications has the serious disadvantage that it does not guarantee the privacy of its users, since it is not possible to verify the real identity, whether malicious or trustworthy, either of the server that sends the sensitive information, or of the recipient who receives said information. Moreover, by transmitting the users' personal information uncoded, the system does not provide strict procedures to guarantee the security against third parties of the data transmitted from and to the Apache web server. Another disadvantage is that the sensitive information is memorized permanently in the database associated with the web server and is always potentially accessible by an ill-intentioned person.

A purpose of the present invention is to achieve a method to search for affinities which is scalable, which prevents the sensitive data contained therein from being undesirably divulged.

The Applicant has devised, tested and embodied the present invention to overcome the shortcomings of the state of the art and to obtain these and other purposes and advantages.

BRIEF SUMMARY OF THE INVENTION

The present invention is set forth and characterized in the independent claims, while the relative dependent claims describe other characteristics of the invention or variants to the main inventive idea.

In accordance with the above purpose, a method to search for affinities between subjects comprises the passages of:
- effecting a step of registering a user with a certification authority, or CA;
- effecting a step of receiving first information relating to the user and of memorizing the first information in a portable electronic device, or PO object, of the user;
- effecting a step of synthesizing the first information memorized in the PO object, by means of transmission to a user interface, or UI, of the local type and associated with each user, which provides to process the first information memorized;
- effecting a step of encrypting the first information, by means of the UI, and memorizing the first encrypted information in the PO object;
- effecting a step of disseminating the first encrypted information to other PO objects of other users in geographical proximity;
- effecting a step of gathering second encrypted information relating to other users, sent by the PO objects in geographical proximity;
- effecting a step of decrypting the first encrypted information and the second information encrypted at the certification authority CA;
- effecting a step of processing and analyzing the first and second decrypted information, so as to identify affinities between them, at the same certification authority CA;
- effecting a step of notifying the affinities, by means of the same certification authority CA.

The method according to the present invention is scaleable, it prevents the unwanted divulgation of the sensitive data processed and is provided with strict procedures to guarantee the security of the data.

According to the present invention, the method to search for affinities between subjects effects a selection of the people with whom to exchange personal information, and hence among whom to search for possible affinities, for example the same routes in the car, based on the concept of physical proximity as a prerequisite for the search, that is, the concept of an at least temporary geographical/spatial proximity of the persons involved.

According to one feature of the present invention, the method effects a control of the divulgation of the personal information, based on a double cryptography and the use of a third party certification authority (a trustworthy subject or Certification Authority, CA).

According to the present invention, the method to search for affinities is based on PO objects of the pervasive type, which are portable electronic devices, equipped with transmission and/or reception means, to communicate with other, similar compatible electronic devices, inside a circumscribed space and/or a network of electronic devices. Advantageously, unlike US-A-20050250552, the present invention is not dependent on a specific RF communication system, which can therefore be Bluetooth, ZigBee, WiFi or any other. The POs used in the field of the present invention contain the information used to search for affinities, for example to allow the automatic and transparent exchange for the user of information relating to his/her movements. This information is exchanged, anonymously, or encrypted, with the surrounding pervasive objects POs, by means of harvesting and dissemination operations.

Therefore, according to the present invention, the information is exchanged only between subjects that are geographically near, because a physical interaction is involved, by means of anonymous communication based on electromagnetic waves between the pervasive objects, thus reducing the huge quantity of data to be managed, and surprisingly increasing the effectiveness in tracing affinities between nearby subjects.

According to the present invention, the suitable technique for exchanging information is to use a no-correspondence unidirectional protocol; however, other types of protocols and types of wireless connections can be used, including commercial systems such as Bluetooth®, 802.11, ZigBee, etc. The present invention is even more advantageous when a personalized RF technology is used instead of existing commercial systems, due to the possibility of exploiting to the utmost the lightness and simplicity of the network protocol that can be used, which can be unidirectional and no-correspondence.

The information exchanged is potentially confidential and delicate and, according to the present invention, it must be managed with adequate control by the user. The method proposed allows to search for affinities without the information being divulged to anyone on the user's habitual movements or his/her instantaneous position, and without this information being memorized constantly in the database of any server. When at least one affinity is found, the user can choose to exchange his/her data with the other "similar" user by means of the trusted authority CA, in which both the users are registered and which guarantees their authenticity and honesty.

The information exchanged between pervasive objects is not immediately usable, since it is managed with encryption systems on two levels. The first encryption level, based on a public-private asymmetrical key, such as for example RSA or ECC, serves to prevent the person receiving data and information from being able to read the content. The data and information, in fact, must be transferred to the Certification Authority CA, which is the only entity able to decipher it.

According to the present invention, the second encryption level, based on a public-private asymmetrical key, such as RSA or ECC, allows the CA to verify the authenticity of the data received and the non-falsifiable association with the user who generated said data, that is, it guarantees that the messages received are not rejected.

According to the invention, pairs of data are sent to the CA (data relating to the user who received the transmission of another PO and his/her own data) and the CA analyzes and compares the data immediately.

In the example of an application to car pooling, the CA applies algorithms to search for correspondence or matching, analyzing the users' datatrips and comparing them with the compatibility parameters chosen by the users themselves. These parameters, pre-memorized in the CA in the users' profile or inserted as additional information in the datatrips, allow to refine the manner in which the affinities are searched for. For example, it is possible to limit the maximum value of extra distance, or the maximum time period, which the car pooler is willing to accept, or his/her willingness to accept a car pooler who is not similar for the same number of days per week, or whether the car pooler is looking for passengers, drivers, or both, or again whether he/she is looking for a car pooler to share the whole journey or only a part of it.

Advantageously, the present invention allows to facilitate the sharing of knowledge among potential users of services such as car pooling, and make it automatic, by means of a capillary distribution of electronic infrastructures, which achieve an architecture based on portable devices, generally pervasive objects POs, which are able to localize and automatically formalize the average route of authorized and interested users, also based on infrastructures known to the state of the art or similar to what is described in the patent application US-A-200505140507, in a secure and automatic manner, and to send data on their movements, in encrypted mode, to the CA.

In this way, advantageously, the CA compares only data relating to proximity events, that is, relating to the occasional meeting of users, irrespective of whether they are aware of it or not.

Advantageously, furthermore, the CA does not need to memorize the users' data permanently, and once the comparison is terminated, it will signal the affinity to the users, allowing them to decide whether to reciprocally reveal their identities, but it will not have any need to keep the information contained in the datatrips memorized.

In this way any breach of security of the CA would not be a critical element.

Advantageously, therefore, we have a high level of privacy and security in treating the personal information, an anonymous sharing of information between users and a general strength of the overall management architecture.

Advantageously, moreover, the use of a certification authority CA which effects the analysis of affinities and of a module (user interface, UI) to configure the pervasive objects POs allows to reduce the calculation capacity required of said objects and consequently to reduce the complexity of the hardware and hence the cost.

According to an advantageous feature of the present invention, the method allows both to prevent divulgation of personal data without explicit consent from the user, and also to provide strict procedures to guarantee the security of the data transmitted.

To this purpose, in the case of an application to car pooling, the method provides to:
  effect a registration of each user at the CA;
  define the user's average route or datatrip and memorize it in the PO object;
  transfer uncoded the defined route, relating to the specific user, from the specific user's PO object to a corresponding computer of the user, connected via Internet to the CA;
  encrypt the specific user's route uncoded by means of his/her own computer;
  transmit the encrypted route from the user's own computer to his/her PO object and afterwards from the latter to the other PO objects in geographical proximity;
  transmit and share, due to proximity, the encrypted routes among all the POs of the users in geographic proximity;
  transmit the encrypted route of the specific user from the user's computer to the CA, via Internet, and transmit the encrypted routes received from other users from the PO object of the specific user to the same user's computer and from this to the CA, again via Internet;
  decrypt the encrypted routes, exclusively at the CA, both of the specific user and of the other users, and process and evaluate possible affinity; and
  notify users of the existence of potential compatibility of datatrips and vehicle pooling;
  effect a step of specific consent or dissent from the user interested in sharing his/her personal information with the users for whom the datatrip compatibility has been verified;
  cancel the decrypted routes memorized at the CA.

Other advantageous features of the present invention are connected to the economy nature of the pervasive objects POs on the user's side and the scalable deployment of the server's network on the side of the organization and the CA. Moreover, there is an advantageously low consumption of energy, a limited direct interaction between user and PO, high reliability in searching for compatible affinities and easy maintenance of the apparatus.

Finally, for particular applications, it is advantageously possible to exploit the intrinsic characteristics of the pervasive architecture in order to acquire, in an automatic and totally transparent manner for the user, all or part of the information which will subsequently have to be exchanged. Some examples of advantageous applications are, as we said, in car pooling, where the pervasive objects can acquire the information autonomously on the movements of the user and, analyzing this information, determine the potentially useful routes for car pooling; and in baby sitting, where the pervasive objects can monitor and record the movements of the children, identify anomalies and activate alarms when necessary.

Advantageously, for example in applications in the health field or civil defense, users possessing their own pervasive devices can disseminate information relating to their own competences, health information, etc., useful in the case of an emergency.

Another example of an advantageous application of the invention is to memorize one's own sensitive health data in the PO in a secure and reliable manner. Such data are used by a certified health structure or a structure registered with the CAs that provide the service; the structure is extraneous to the user, that is, it does not know the user's health data. When the user accesses the structure, for example as a visitor, the user's encrypted data are read by the structure's PO device, which, if and when necessary, requests decryption from the CA that guarantees the service, also specifying the type of research that the structure needs. With this technique, we advantageously obtain that the user's data can never be decoded by anyone, not even by the host structure, while the structure itself, if properly registered with the service, is able to know in almost real time the availability of particular resources in its area, always guaranteeing total anonymity and hence protection of privacy.

Furthermore, in the search for personal affinities, regular customers of public places, for example discotheques, could use the method to find their soul mate or marriage bureaus could base their services on these pervasive devices.

Finally, the devices themselves could advantageously be used for applications in games.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
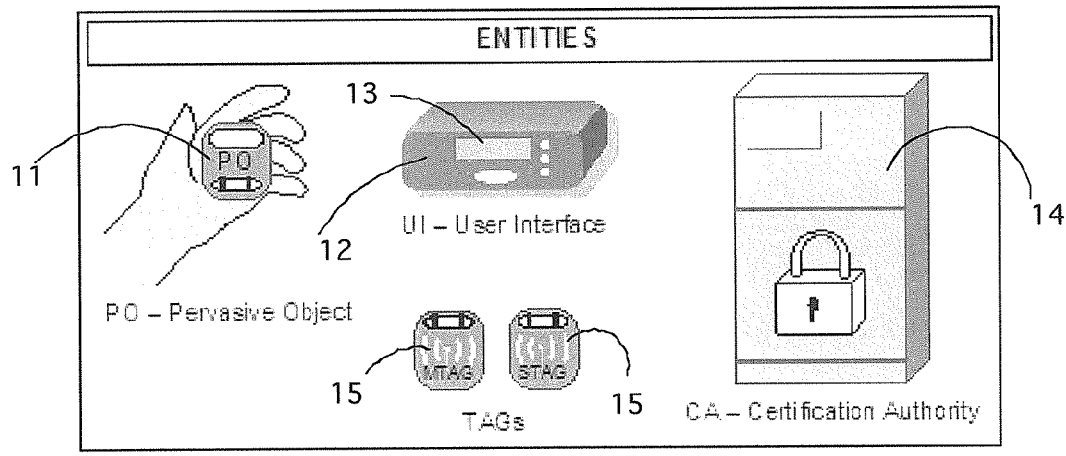
FIG. 1 is a diagram of an apparatus according to the present invention.

According to the present invention, in FIG. 1 the reference number 10 denotes in its entirety an apparatus for searching for affinities, able to perform a method to search for affinities between subjects.

The method and apparatus 10 proposed will be illustrated, as a non-restrictive example, with reference to the car pooling application. In this case the apparatus 10 comprises at least four main entities, as can be seen in FIG. 1, that is, at least a pervasive object 11, hereafter referred to as PO, at least an electronic/computer processor or docking station 12 for the POs 11, and able to be connected to Internet, at least a user interface UI 13, advantageously integrated into the processor 12, and at least a certification authority CA 14. Optionally, the apparatus 10 also comprises a plurality of TAGs 15 distributed in a network to automatically localize all the routes sent by each PO 11, which will be described hereafter.

Figure 2:
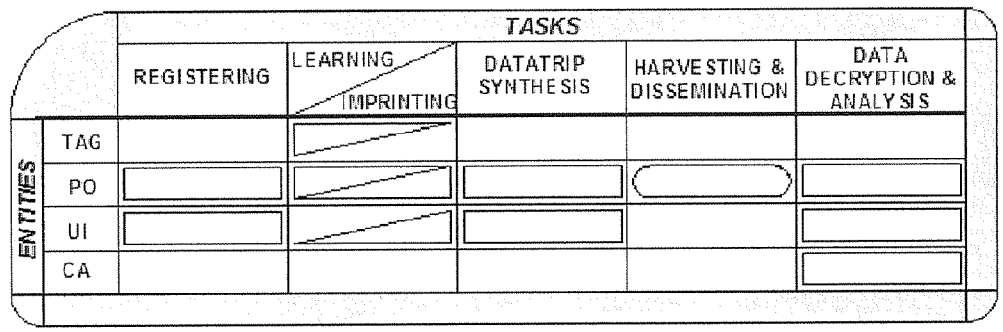
FIG. 2 is a table of a method according to the present invention.
Figure 4:
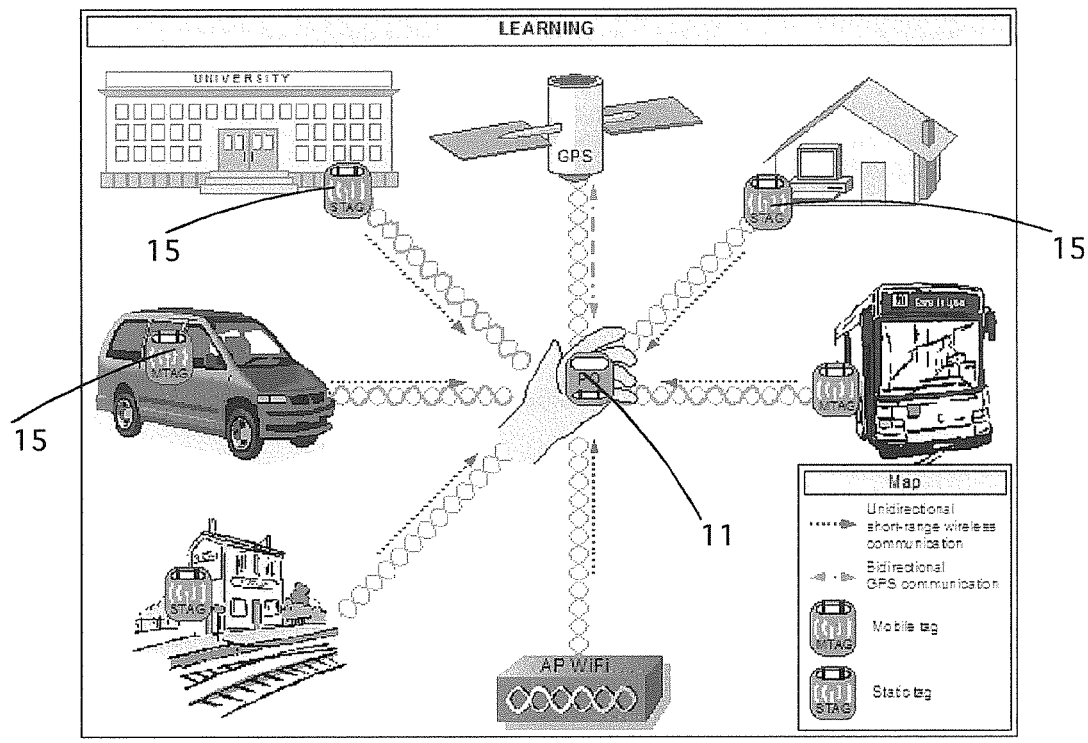
FIG. 4 is another diagram of a method according to the present invention, relating to a learning step.

According to the present invention, the user configures his/her own PO 11, learning step in FIG. 4, by saving an encrypted description of his/her daily route, with the respective times of the journey, generating a so-called datatrip (FIG. 2). This information is sent autonomously from every PO 11 towards all the other POs 11 of all the other users who come into contact or are to be found in the vicinity of the user, while at the same time the opposite occurs, that is, every individual PO 11 receives all the encrypted information and datatrips from the other POs 11. Therefore, every PO 11 receives every day a massive amount of information, datatrips, but these are not directly and immediately decodable by the user, so as to protect the privacy and security of all the users of the car pool.

Every user must send his/her own datatrip and the datatrips collected by his/her PO 11 to the CA 14. The CA 14 then decrypts the encrypted information and searches for and analyzes the possible compatibilities between registered users who have come into contact with each other through proximity. In the event of a positive match, the CA 14 notifies the users involved of possible analogous routes, for example to go to work, respecting suitable procedures to control and verify the data.

In the event that the apparatus 10 comprises the network of TAGs 15 and that it is situated in physical proximity to the operative PO 11, the PO 11 itself is able to analyze the user's movements and automatically extract possible typical recurrent datatrips; in the same way, if provided with the suitable software, the PO 11 can take information on movements from other wireless systems, such as GPS and WiFi access points.

Figure 3:
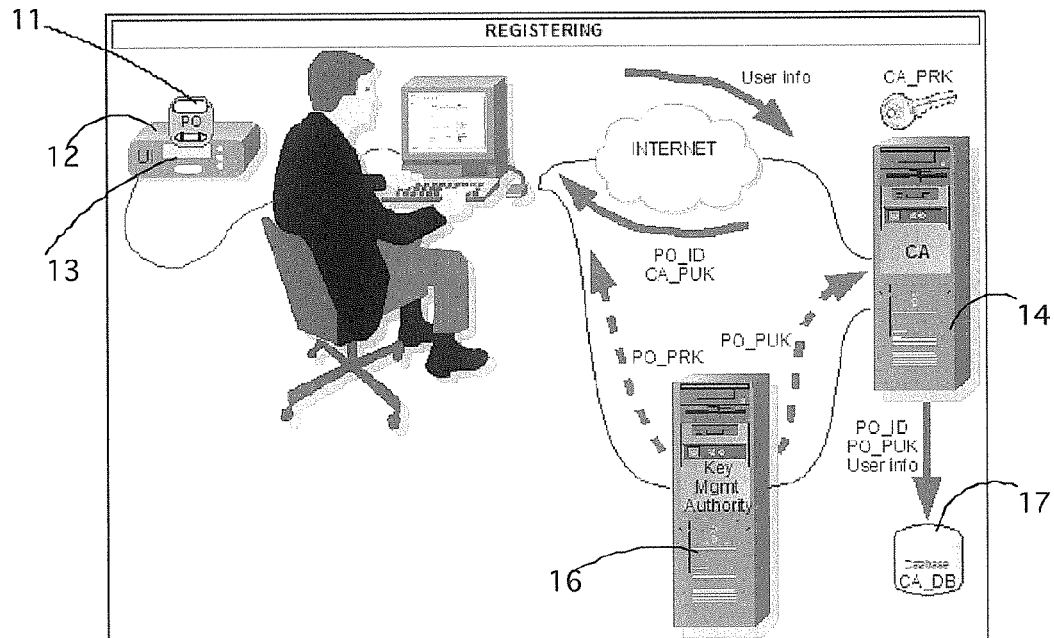
FIG. 3 is a diagram of a method according to the present invention, relating to a registration step.
Figure 8:
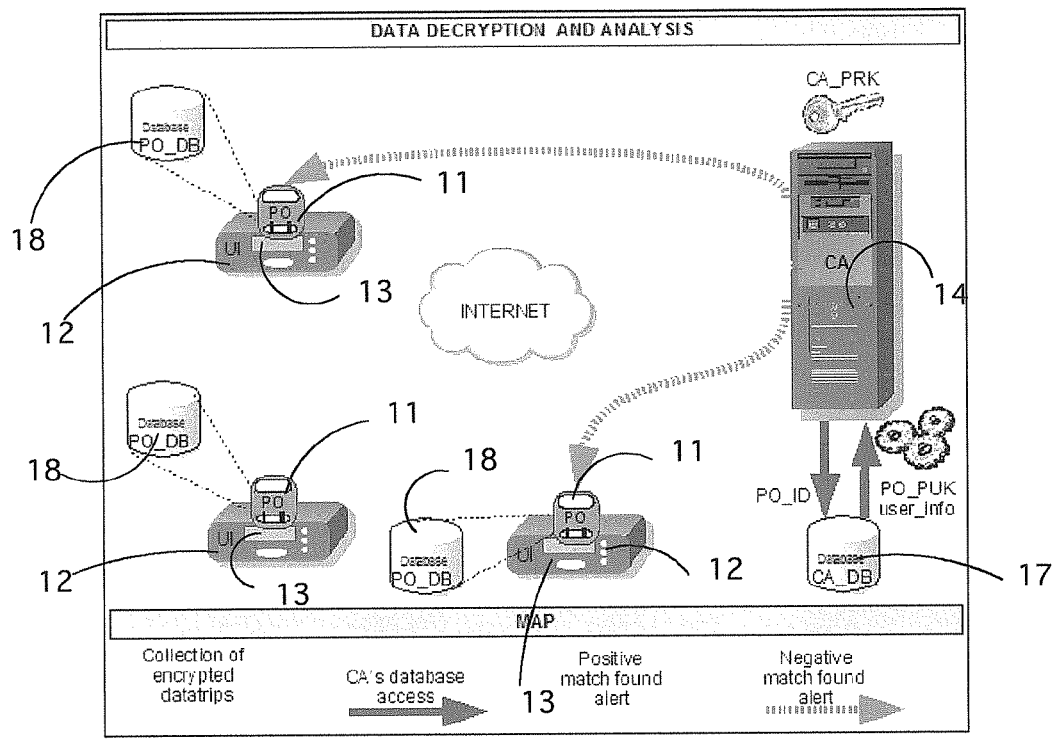
FIG. 8 is another diagram of a method according to the present invention, relating to a decryption and data analysis step.

As will be illustrated in detail hereafter in the description, the method according to the present invention provides the following steps:
  certification of users (FIG. 3);
  definition and encryption of datatrips;
  exchange of encrypted datatrips (FIG. 4) between pervasive objects 11 and with the CA 14;
  decryption of datatrips and analysis of affinities input and output, effected by the CA 14 (FIG. 8).

According to the present invention, in particular, the POs 11 are devices made to collect and disseminate datatrip information.

Advantageously the POs 11 are made as small "ornaments", which do not need any interactions with the owner user, and therefore there is no need for keys to be touched, or keyboards, screens, or signaling leds. The POs 11 are equipped with an ON/OFF switch and optionally with a small display to indicate the state of battery charge. In fact, the PO 11 is equipped with at least a rechargeable battery, operating for several days without needing a recharge, and suitable to provide a suitable energy feed for the circuitry, in order to allow the necessary communications with the other POs, with the UI 13 of the processor 12 and the TAGs 15. Advantageously, for example by means of an inductive recharging system, the batteries do not require particular care and/or effort to be re-activated by the user of the PO 11.

The PO 11 integrates a plurality of technologies, and is able to perform a plurality of functions.

In particular, the PO 11 comprises a wireless communicator for the interchange of encrypted datatrips among all the POs 11. Moreover, the PO 11 is equipped with a communication system through the UI 13, advantageously the same one used for intercommunication among all the POs 11, or alternatively a cabled system, associated with a recharging system, for example through a USB interface.

Figure 7:
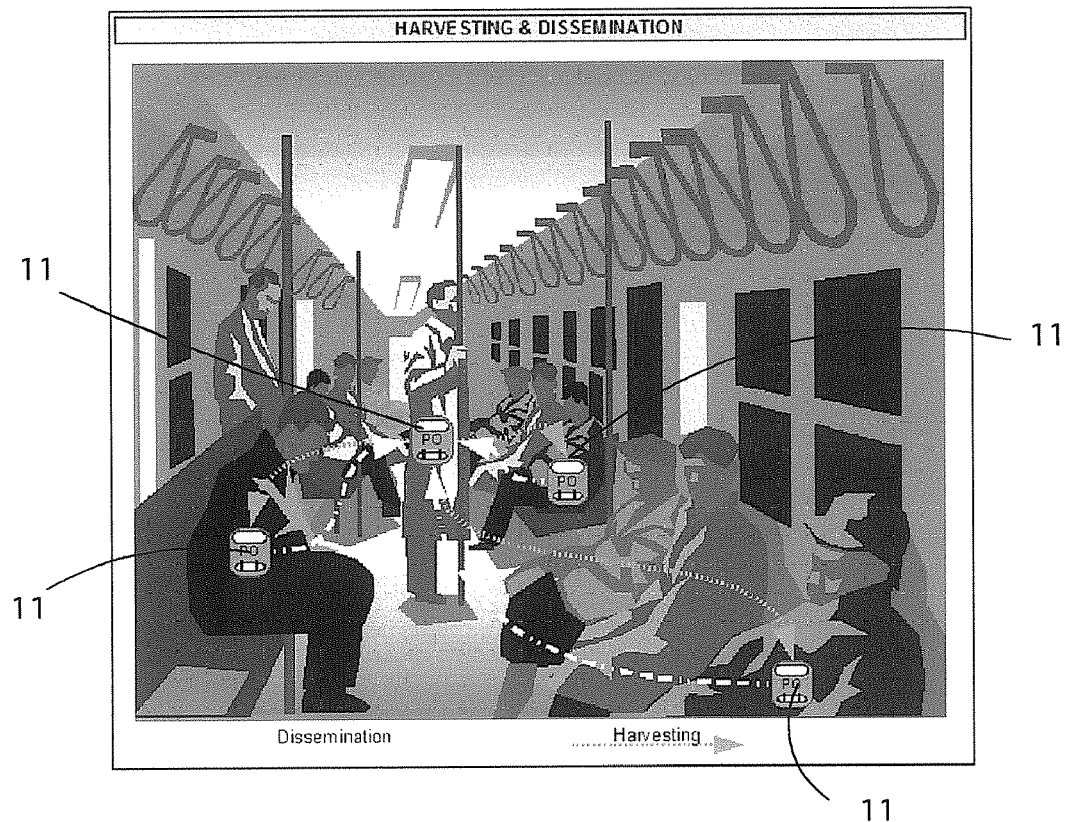
FIG. 7 is another diagram of a method according to the present invention, relating to a harvesting and dissemination step.

The PO 11 is provided with a processor with a relative calculation and memorization capacity, to memorize a high quantity of "raw" information during a learning step, and also during the steps of harvesting and disseminating the information (FIG. 7).

The calculating capacity required by the PO 11 is very limited, thanks to the fact that no form of cryptographic management has to be implemented therein, since this operation is delegated to the UI 13. This means that the hardware requirements are essentially limited to a simple mini-processor, possibly also with 8-bit architecture, a quantity of memory that can be estimated as a few megabytes, a wireless communication system and a system of communication towards the UI 13 which could be based on serial technology, USB, infrared or other, or on the same wireless system used for communication between the POs 11.

In the event that a network of TAGs 15 is provided, the PO 11 is equipped with an internal timing system, or clock, to provide the internal software with the correct time and data of the events, with a wireless communication system with the TAGs 15 and with a geographical localization system such as GPS.

While it is operative, the PO 11 (FIG. 2) is involved at different moments in the following activities:
  interaction with the UI 13 of the processor 12, to store the encrypted datatrips;
  sharing the encrypted datatrips with other POs 11 and memorization of the datatrips received from the latter;
  possible dialog with the TAGs 15 and memorization of the information extracted therefrom, with possible integration with other information of geographical localization.

The PO 11 can easily be worn by the user without particular care and is advantageously able to be integrated in devices of mass use, such as cell phones.

According to the present invention, moreover, the UI 13 is the means of interaction between each PO 11 and the system of certification and search for affinities of the CA 14. The UI 13 guarantees security and optimizes the work system of the CA 14, and relieves the PO 11 of higher calculation requirements, analysis and connection with the CA 14. Advantageously, the UI 13 is integrated into the processor 12 or is a docking station connectable with the processor 12, for example via USB or WiFi, and also provides to operate the battery recharge. The UI 13 has memorized a software or a packet or suite of software which implement a search and encryption algorithm and also a software or packet or suite of software able to automate and manage the interaction with the CA 14, for example via Internet.

According to the present invention, the UI 13 performs a plurality of functions, including:
- defining and encrypting characteristic datatrips, based on the "raw" information relating to the user's movements received from the POs 11, and transferring the aforesaid information to the PO 11;
- obtaining the encrypted datatrips collected by the PO 11;
- sending the datatrips to the CA 14, through a secure connection, for example ssh;
- managing the system that defines the datatrip information, either manual or by means of self-learning from the TAGs 15;
- managing the energy feed system for the batteries of the PO 11.

According to an advantageous form of embodiment of the present invention, moreover, the PO 11 collects information relating to the movements of the user from the TAGs 15, and the UI 13 is able to process this information, defining a typical datatrip of the user. The information of the TAGs 15, optionally able to be integrated with other information, is memorized in a database of the UI 13, called PO_DB 18 and advantageously is memorized by the PO 11, chosen from among the most significant information for localizing every characteristic datatrip, achieving the learning step. Advantageously, by doing this, the possibility is maintained of operating with the necessary quantity of memory for the information required and with the necessary computing complexity of the algorithm of the affinity search, furthermore without overloading the PO 11.

The algorithm, performed on the UI 13, interrogates the database and processes the content, by managing the events stored as input of a finite state machine. Subsequently, every possible localization of the PO 11 is associated with every different state, for example home, car, bus and suchlike. The algorithm reconstructs the daily datatrip of the user from the collection of data which the PO 11 acquires every day, and makes an average thereof, in order to identify possible recurrent routes covered by the user and, when it finds one, stores the result of the processing in the user's datatrip. Advantageously, the user confirms or memorizes the datatrip again, in order to share it with the other POs, by means of pervasive technology. According to the present invention, the algorithm must be able to process a large quantity of information, so that the result can assume an acceptable statistical value; advantageously also, the learning step must be adequately protracted over time, for example at least a week for users who commute, so as to have reliable and accurate results.

According to the present invention, the CA 14 ensures the required degree of security of the method and apparatus 10. Advantageously, the CA 14 consists of at least a central server or a network of servers, for organizational reasons or a question of scale or redundancy, which the UI 13 can access via Internet.

According to the invention, the CA 14 is able to manage the registrations of new users of the car pooling service using IT, memorizing a minimum set of the user's personal information which cannot be divulged without authorization from the user himself, and defining the parameters for encryption of the relative PO, as will be shown hereafter.

Moreover, the CA 14 is able to put the UIs 13 on standby for connection and, when required, to verify the correct identification of the UI that requires authentication and set a secure connection with the UI 13 involved.

Furthermore, from the validly connected UI 13 the CA 14 receives the relative user's encrypted datatrip and all the datatrips collected by the PO 11.

The CA 14 decrypts the datatrip of the connected user and also the other datatrips, possibly interrogating other CAs, in order to obtain other decryption keys.

According to the present invention, the CA 14 searches for possible compatibilities, at least partial, between the datatrips of users collected by the PO 11 and the datatrip of the connected user, and in the event of verified compatibility, signals this correspondence to the users concerned, maintaining mutual anonymity, until explicit consent is given by the users concerned to divulge the information and authorize to proceed.

Unlike US-A1-20050250552, in the present invention the protection of privacy is guaranteed to the highest levels and does not only depend on the prior consent of the users registered with the service. This means that each individual user is the first person responsible for the management of his/her own data. The data are not made available except after consent, given by the user on each occasion, following the identification of a correspondence of the data by the CA 14. Alternatively, if the entity with which the user's PO 11 shares his/her own data is a trusted entity, or trusted by its very nature (a hospital, clinic, etc.), the user may previously allow identification and contact, for example in order to manage possible emergencies, or he/she can request to be notified (for example by means of a message received by the PO 11 itself) that the correspondence of his/her own data with those searched for by the structure has indeed been identified and, following this, can choose whether to allow his/her own identification or not.

According to the present invention, as we said, the apparatus 10 advantageously comprises a network of TAGs 15. Each TAG 15 consists of an electronic mini-device, equipped with wireless communication capacity, computing and memorization capacity, although limited, and high energy autonomy. According to the present invention, the TAGs 15 are made as MTAGs (mobile TAGs) or STAGs (static TAGs), depending on the system of data transmission and energy feed.

Advantageously, according to the present invention, the TAGs 15 can be installed in crucial positions of the geographical area to be covered with the pervasive car pooling service (FIG. 4). In particular, the TAGs 15 are used to inform the POs 11 in physical proximity on the relative and/or absolute geographical position of the POs 11. Advantageously, the TAGs 15 can be installed at the homes of the users, inside private means of transport (motor cars, motor cycles), or public means (buses), which cover the area concerned, at the train stations, bus stations and underground stations and in busy public buildings, such as post offices, hospitals and suchlike. This disposition to cover the geographical area involved in the car pooling service is particularly advantageous, since it is an optimum compromise between a fine geographical cover, very dynamic in itself, and a low social cost, providing a substantially low number of TAG devices 15, and guaranteeing great availability of information and considerable self-learning capacity for the POs 11; it must be underlined that the PO 11-TAG 15 communication is one-way, from the TAGs 15 to the POs 11, and the TAGs 15 do not take information from the POs 11. This is a great advantage for privacy and security.

It must be noted that, depending on the position, the static TAGs 15 can easily send absolute position data, such as geographical coordinates, memorizable, at the moment the TAG 15 is installed, in a ROM memory of the static TAG, while the mobile TAGs are able to supply information on the means of transport on which they are installed. The POs can also recoup information from possible sources which do not belong to the network of TAGs 15, such as WiFi access points, advantageously extending the available information and exploiting pre-existing devices to the utmost. Furthermore, the TAGs 15 also send data relating to the TAG 15 system itself, such as the TAG standard, the type of installation and suchlike.

Since the TAGs 15 can communicate with the POs 11 at any moment, they must always be active, in order to guarantee correct communication; the TAGs 15 can be made by implementing passive or semi-passive technologies, or carrying autonomous energy sources, or again connected to a feed network comprised in the place where they are disposed, such as in the motor vehicle, home and suchlike.

We shall now describe the operations and passages of the method according to the present invention and the actions performed by the entities of the apparatus 10 illustrated above, with particular reference to FIG. 2 et seq.

Figure 5:
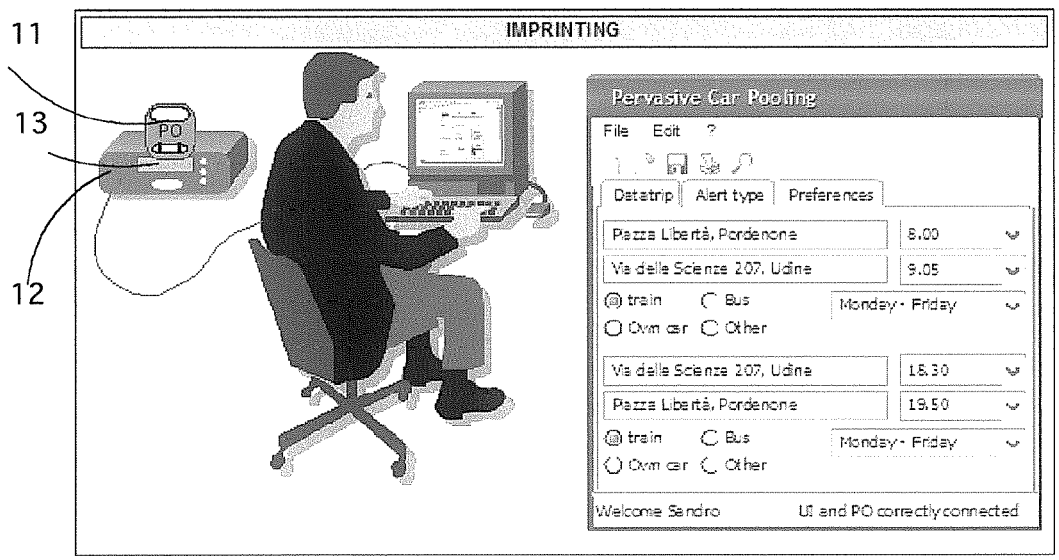
FIG. 5 is another diagram of a method according to the present invention, relating to an imprinting step.

According to the present invention, the registration step (FIG. 3) is the first passage that involves every new user; in fact, every user who uses the car pooling service has a PO 11, a univocal identification code and a pair of encryption keys, a public key, hereafter called PO_PUK, and a private key, called PO_PRK, provided by a key management authority 16, advantageously integrated with the CA 14, unless the user already has one. Moreover, it is provided to memorize the public key of the CA 14, hereafter called CA_PUK, in the UI 13 of the user, which provides, as we said, to encrypt the datatrip sent and makes it accessible only for the CA 14. Once registration is complete, the steps of learning (FIG. 4) and/or imprinting (FIG. 5) are started.

The learning step occurs if the area involved in the car pooling and the means involved are equipped with TAGs 15; in this case, this step comprises the interval of time that starts with the registration of the user and ends with the definition of the user's datatrip, usually several working days. In this step, the PO 11 communicates only with the network of TAGs 15 and/or other pre-existing devices, as WiFi access points, and memorizes all useful information for localizing and defining the datatrip of the owner or user of the PO 11. When the learning step has been successfully accomplished, the step to synthesize the datatrip takes place, in which the user can have the possibility of confirming or not the datatrip obtained through synthesis.

If there are no TAG 15 networks, the imprinting step replaces the learning step and allows the user to set his/her datatrip manually.

Figure 6:
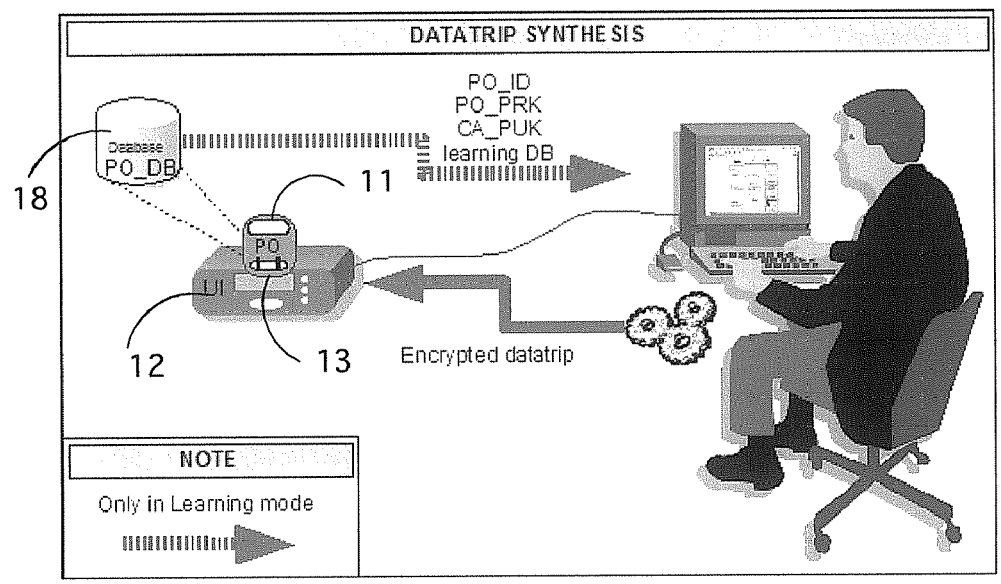
FIG. 6 is another diagram of a method according to the present invention, relating to a route synthesis step.

The step to synthesize the datatrip (FIG. 6) provides that the information on the user's movements which the PO 11 has received from the TAGs 15 or that the user himself has set manually, is transferred to the user's UI 13 and processed as described previously. In any case, during this step, the datatrip is confirmed by the user and encrypted by means of the UI 13, and then transferred to the PO 11 so as to be disseminated to all the other POs with which it comes into contact or communication, due to proximity.

To this purpose, the method according to the present invention comprises a step to harvest and disseminate (FIG. 7) the datatrips. The PO 11 sends its encrypted datatrip, dissemination sub-step, and acquires the datatrips sent by the other POs 11 with which it comes into contact, harvesting sub-step. In this step two instances advantageously coexist, that is, the need that the datatrip is totally undecipherable both for unauthorized users and for ill-intentioned users, and the need not to memorize the datatrips which are not compatible with those of the user.

Advantageously, according to one form of embodiment of the present invention, for this purpose it is provided to define a non-complete version of the datatrip, able to be sent as an uncoded text to all the surrounding POs 11, for example comprising only temporal planned movements without geographical indications, so as to achieve a preliminary filtering step directly at the PO 11.

Advantageously, during the harvesting step, the POs 11 do not begin a pure communication with every other PO 11, but limit themselves to send and receive packets of encrypted data by means of a one-way communication channel.

According to the present invention, the method to search for affinities between subjects also comprises the steps of decryption and analysis of the data (FIG. 8). In fact, the data and information acquired by the PO 11 during the harvesting step, substantially encrypted datatrips, are sent during this step to the CA 14, by means of the UI 13, exploiting a secure connection with the CA 14 itself, set up via Internet by the processor 12. To all effects, the datatrip represents the datum or data of comparison for the search for affinities carried out by the CA 14. Advantageously, according to the present invention, a plurality of CAs 14 are provided, which can be interrogated by each CA 14 of the network of secure servers for the compatibility search. The result of the compatibility search is transmitted, still remaining anonymous, to the pair or group of users having analogous datatrips. At this point, users can selectively authorize the CA 14 to disseminate their data inside the selected group of users. According to the present invention, the CA 14 makes the user's name and relative datatrip available only after every user in the pair or group selected has given explicit agreement to the uncoded treatment of his/her data.

According to the present invention, the security and privacy of the personal data and datatrip of every user is guaranteed by using a combined authentication system with digital signature and a code for the datatrip.

To this purpose, the code of the datatrip is based on the fact that the POs 11 are not able to decrypt the possible encrypted datatrips which they receive from other POs 11. This operation is carried out by the CA 14, which receives the data from the UI 13 which in turn has received it in "raw" form from the PO 11.

Figure 9:
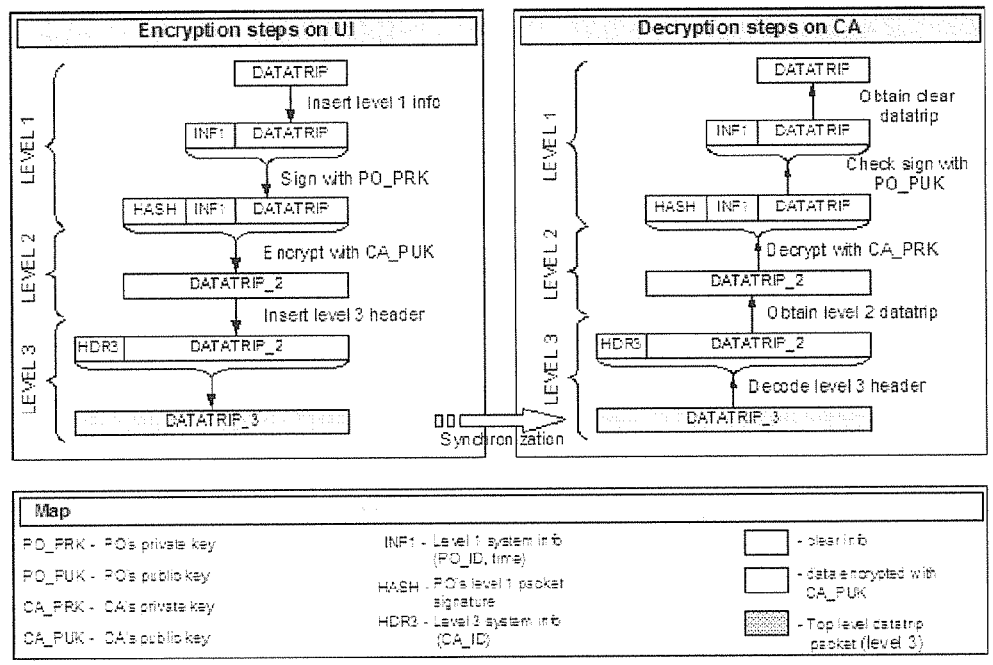
FIG. 9 is another diagram of a method according to the present invention, relating to an encryption and decryption step.

The method proposed to guarantee anonymous and secure communication is based on a double-level code, and each level is provided with two keys (asymmetrical code) (FIG. 8). As already said, each CA 14 is equipped with its own pair of keys: a public key CA_PUK, made known to all the POs of the car pooling system, and a private key CA_PRK, known only to the CA 14 itself. Furthermore, each PO holds both its own keys, the public key PO_PUK, which the CA memorizes when the user registers, or acquires from a source of secure digital certificates, and the private key PO_PRK, which is memorized only inside the respective UI 13. Applicant has developed a coding and decoding system which will be briefly illustrated, with reference to FIG. 9 and the levels represented there. Hereafter S shall be taken to represent the function of numerical code of a string or hash, C is the encryption function, D is the decryption function and $S^{-1}$ is the verification function of the string's numerical code.

The creation of the encrypted datatrip, once the datatrip has been validly defined in the learning or imprinting step, provides that the datatrip is signed or encoded numerically by means of the private key of the PO, PO_PRK, expressed as HASH, together with some information INF1, such as date and time of processing:

$$HASH = S_{PO\_PRK}(INF_1 + DATATRIP_{Clear});$$

after the calculation of the signature, a first level packet is created which comprises the uncoded or clear datatrip, $DATATRIP_{Clear}$, the first level information INF1 and the signature HASH and calculated thus:

$$DATATRIP_1 = (HASH + INF_1 + DATATRIP_{Clear});$$

afterwards, the $DATATRIP_1$ packet is encrypted using a double key system, by means of the public key CA_PUK:

$$DATATRIP_2 = C_{CA\_PUK}(DATATRIP_1);$$

after the second level packet $DATATRIP_2$ has been obtained, a third level header is added, provided uncoded and containing all the information relating to the CA to which the packet is addressed, so that it can be decoded and processed:

$$DATATRIP_3 = (INF_3 + DATATRIP_2).$$

Among the third-level information present uncoded in the encrypted datatrip which the POs 11 exchange with each other, a series of data not relevant for the user may be inserted, that is, not sensitive, but which can be advantageous in a pre-matching step at the PO 11 level.

Advantageously, the system can alternatively make use of a second level based on two encryption systems, not unlike the techniques used in known protocols such as PGP. In this case the first level is encrypted with a random symmetrical key, or generated there and then according to defined rules, and the symmetrical key, encrypted by means of the asymmetrical public key of the CA 14, is associated with the message obtained. This allows to lighten the computational load of the UI 13 but above all of the CAs 14 which thus operate with an asymmetrical encryption on packets of smaller size.

The step of decoding the datatrip takes place after the CA 14 responsible has received the encrypted datatrip; firstly all the third level information is decrypted, to obtain the encrypted second level datatrip:

$$DATATRIP_2 = (DATATRIP_3 - INF_3);$$

at this point, the CA 14 uses its private key CA_PRK to decrypt the encrypted second level datatrip and obtain the first level packet with clear text:

$$DATATRIP_1 = C_{CA\_PRK}(DATATRIP_2);$$

by doing this, the CA 14 obtains the identification or PO_ID from the decoding of the first level datatrip and from this is able to retrace, in its own database CA_DB 17, the public key of the user associated with the relative user PO_ID. When the second level is encoded based on two encryption systems, symmetrical and asymmetrical, the CA 14 proceeds in a totally identical manner, first recouping the random symmetrical key using its own private asymmetrical key, and afterwards, when the key has been recouped, carries out the symmetrical decryption procedure on the remaining part of the second level, therefore obtaining the first level.

At this given point, the CA 14 controls the authenticity and integrity of the datatrip by comparing the numerical decoding value calculated, "hashset", and the HASH of the packet:

$$S^{-1}_{PO\_PUK}(HASH) = ?(INF_1 + DATATRIP_{Clear});$$

if affirmative, the original datatrip is obtained and also the uncoded first level information; otherwise, on the contrary, if the calculated "hashset" values and HASH proper differ, the processing and display of the data are prevented, given that it is not possible to guarantee the authenticity and/or integrity of the datatrip received.

This coding and decoding system guarantees that nobody can decipher the content of the encrypted datatrip except for the CA 14 responsible for this task.

It is clear that modifications and/or additions of steps and/or parts may be made to the method and apparatus as described heretofore, without departing from the field and scope of the present invention.

It is also clear that, although the present invention has been described with reference to some specific examples, a person of skill in the art shall certainly be able to achieve many other equivalent forms of method and apparatus, having the characteristics as set forth in the claims and hence all coming within the field of protection defined thereby.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method to search for affinities between subjects, comprising the passages of:
   providing a certification authority that is able to act as a trustworthy subject in order to control divulgation of personal information of said subjects;
   effecting a step of registering at least one user with said certification authority, wherein the registration involves memorizing, by the certification authority, a minimum set of said user's personal information which cannot be divulged without authorization from said user himself;
   effecting a step of receiving first information relating to said user and memorizing said first information in a portable electronic device of said user;
   effecting a step of synthesizing said first information memorized in said portable electronic device by means of transmission to a user interface which provides to process said first memorized information;
   effecting a step of encrypting said first information and memorizing said first encrypted information in said portable electronic device;
   effecting a step of disseminating said first encrypted information to other portable electronic devices in geographical proximity;
   effecting a step of collecting second encrypted information relating to other users registered in said certification authority, sent by other portable electronic devices in geographical proximity;
   effecting a step of decrypting said first and second information encrypted, wherein said first and second encrypted information are sent to the certification authority and temporarily memorized therein and wherein the decryption is exclusively effected at said certification authority and wherein the certification authority verifies the authenticity of the data received and the non-falsifiable association with the user who generated said data;
   effecting a step of processing and analyzing said first and second decrypted information, in order to identify affinities between said first and second information, at said certification authority;

effecting a step of notifying said affinities, by means of said certification authority, wherein the step of notifying involves signaling the affinity to the users, allowing them to decide whether to reciprocally reveal their identities and wherein the first and second information are canceled and not kept by the certification authority after notification of said affinities.

2. A method as in claim 1, wherein, in the notifying step, the certification authority signals the affinity to the users concerned, maintaining mutual anonymity, until explicit consent is given by at least said one user concerned to divulge the information and authorize to proceed.

3. A method as in claim 1, wherein during said registration step:
said user is equipped with said portable electronic device, with an identification key and with a pair of encrypted keys, public and private;
said user sends his/her own personal information to said certification authority which encodes said personal information in a database.

4. A method as in claim 1, wherein said step of receiving first information comprises one or more sub-steps chosen from a group comprising:
a learning sub-step which comprises the passages of making available a network of electronic TAG devices able to send information, and to send and memorize said first information from said electronic TAG devices to said portable electronic device;
an imprinting sub-step which comprises the passage of inserting said first information manually into said portable electronic device.

5. A method as in claim 1, wherein said decryption step, said step of processing and analyzing said first decrypted information and said notification step are effected exclusively by said certification authority.

6. A method as in claim 1, wherein said first information relates to the movements of said user so as to define an average route, and in that said second information relates to the movements of average routes of said users.

7. A method as in claim 1, wherein said first information and said second information relate to one or more items of information chosen from a group of information comprising:
information relating to health;
professional information;
information relating to work;
information relating to the movements of said users;
information of a personal and/or private nature, such as hobbies, sports, psychological and affective profile, aptitudes and suchlike.

8. An apparatus to perform a method as in claim 1, comprising:
a plurality of portable electronic devices able to receive and memorize uncoded data relating to a specific user, and able to interact with each other in geographical proximity in order to effect an interchange of encrypted information relating to other users;
a plurality of user interfaces, each associated in a selective and bi-univocal manner to each of said portable electronic devices, said user interfaces being able to receive said uncoded data of the specific user and said encrypted information of the other users from the respective portable electronic devices, to encrypt said uncoded data into encrypted information of the specific user and to transfer said encrypted information of the specific user at least to said portable electronic devices and all the encrypted information outside via Internet;
at least a certification authority, that is able to act as a trustworthy subject in order to control the divulgation of the personal information of said subjects, by managing the registration of new users, memorizing a minimum set of said user's personal information which cannot be divulged without authorization from said user himself and that is able to receive and only temporarily memorize all the encrypted information from said user interfaces, to selectively decrypt and process said encrypted information, effecting a search for affinities between said information, to verify the authenticity of the data received and the non-falsifiable association with the user who generated said data and also able to notify the results of said search for affinities to said user interfaces, in order to inform said users of said results, and after notification of said affinities, to cancel and not to keep the encrypted information by the certification authority.

9. A method as in claim 3, wherein said step of disseminating said first information and said step of harvesting and memorizing second encrypted information relating to the movements of other users are effected substantially simultaneously by means of an anonymous interchange of said first encrypted information and said second encrypted information between said portable electronic device of said user and other portable electronic devices of said other users in geographical proximity, and corresponding memorization of said first encrypted information and said second encrypted information in each of said portable electronic devices.

10. A method to search for affinities between subjects who use a service for sharing vehicles, or car pooling, comprising the passages of:
providing a certification authority that is able to act as a trustworthy subject in order to control divulgation of personal information of said subjects;
effecting a registration of each user with the certification authority wherein the registration involves memorizing, by the certification authority, a minimum set of said user's personal information which cannot be divulged without authorization from said user himself;
defining the user's average route or datatrip and memorizing the route defined in a portable electronic device of each user;
transferring uncoded the defined route, relating to a specific user, from the specific user's portable electronic device to a user interface, again of the specific user, connected via Internet to said certification authority;
encrypting, uncoded, the specific user's route, by means of said user interface;
transmitting the encrypted route from the user interface to the relative portable electronic device of the specific user and subsequently from the latter to other portable electronic devices of other users, registered in said certification authority, in geographic proximity;
transmitting and sharing, due to proximity, the encrypted routes among the portable electronic devices of the users in geographic proximity;

transmitting the encrypted route of the specific user from the user interface to the certification authority, via Internet, and the encrypted routes received from said other users from the portable electronic device of the specific user to the user interface of the same user and from this to the certification authority, again via Internet, wherein the encrypted routes are temporarily memorized in said certification authority;

decrypting the encrypted routes, exclusively at the certification authority, both of the specific user and of the other users, and processing and evaluating potential compatibility of datatrips and vehicle pooling, wherein the certification authority verifies the authenticity of the data received and the non-falsifiable association with the user who generated said data;

notifying users of the existence of potential compatibility of datatrips and vehicle pooling, based on the previous evaluation of potential compatibility;

effecting a step of specific consent or dissent from the user interested in sharing his/her personal information with the users for whom the potential datatrip compatibility has been verified;

canceling the decrypted routes memorized at the certification authority.

* * * * *